United States Patent [19]

Hanaoka

[11] Patent Number: 5,141,255
[45] Date of Patent: Aug. 25, 1992

[54] JOINT FOR CONNECTING SPRINKLERS TO UNDERGROUND WATER PIPES

[75] Inventor: Katsuyuki Hanaoka, Higashiosaka, Japan

[73] Assignees: Katsuyuki Hanaoka, Higashiosaka; Kabushiki Kaisha Arata Shokai, Sakai, both of Japan

[21] Appl. No.: 725,472

[22] Filed: Jul. 3, 1991

[30] Foreign Application Priority Data

Jun. 13, 1991 [JP] Japan ................. 3-53216[U]

[51] Int. Cl.$^5$ ............................................. F16L 35/00
[52] U.S. Cl. ...................................... 285/4; 285/177; 285/298; 239/203
[58] Field of Search ............. 285/177, 298, 302, 423, 285/32, 303, 4; 239/203

[56] References Cited

U.S. PATENT DOCUMENTS

| | | | |
|---|---|---|---|
| 1,123,746 | 1/1915 | Howard | 239/203 |
| 1,142,225 | 6/1915 | August | 285/32 |
| 1,492,520 | 4/1924 | Meyer | 285/32 |
| 2,989,323 | 6/1961 | Bass | 285/32 |
| 3,083,914 | 4/1963 | Smith et al. | 239/203 |
| 4,099,670 | 7/1978 | Cole et al. | 285/302 X |
| 4,173,989 | 11/1979 | Prest | 285/177 X |

FOREIGN PATENT DOCUMENTS 154912 12/1975 Japan.
92417 7/1977 Japan.

*Primary Examiner*—Dave W. Arola
*Attorney, Agent, or Firm*—Fisher, Christen & Sabol

[57] ABSTRACT

Disclosed is a joint for connecting sprinklers to underground water pipes which is used to raise the head of sprinklers above the lawn by its double shelled inner and outer pipes engaged with each other by their male and female threads depending on the rise of the ground surface by supplying rich soil to the lawn, improved by providing a non-threaded portion to the end of female thread on the inside of an outer pipe so that male thread on the outside of an inner pipe can disengage from the female thread when the joint is lengthened up to its maximum length and/or improved by providing a plurality of stepped male threads to the end of the inner pipe with the smallest diametered one at the top and the largest diametered one at the base and providing an annular groove to the foot of each thread.

5 Claims, 4 Drawing Sheets

JOINT FOR CONNECTING SPRINKLERS TO UNDERGROUND WATER PIPES

FIELD OF THE INVENTION

This invention relates to a joint for sprinklers generally used for watering the lawn on golf links. More particularly, it relates to an improvement on a joint comprised of double shelled pipes which connects sprinklers and underground water pipes.

BACKGROUND OF THE INVENTION

As disclosed in Japanese utility model application laid-open publications No. 50-154912 and No. 52-92417, there has so far been a joint which is used to connect sprinklers and underground water pipes and to raise the head of sprinklers above the lawn by its double shelled inner and outer pipes engaged with each other by their male and female threads depending on the rise of the ground surface by supplying rich soil to the lawn.

However, in such a joint it is difficult to know how far the head of sprinklers can be raised above the ground surface. On this account, managing to raise its head higher, one sometimes tends to damage the joint threads.

Under the circumstances, the present inventors have made intensive efforts to eliminate the drawbacks and finally accomplished the invention. According to the invention, this kind of conventional joint can be improved by providing a non-threaded portion to the end of female thread on the inside of an outer pipe so that male thread on the outside of an inner pipe can disengage from the female thread when the joint is lengthened up to its maximum length. With this device, those who deal with the sprinkler are able to know their highest position possible and will never damage the threads of the joint.

Also, according to the invention, this kind of conventional joint can be improved by providing a plurality of stepped male threads to the end of the inner pipe with the smallest diametered one at the top and the largest diametered one at the base and providing an annular groove to the foot of each thread. With this device, sprinklers with different diametered female thread can be connected to any one of the male threads on the inner pipe only by cutting off needless male thread thereon at the annular groove. The production cost of sprinklers can thus be reduced by this simple adaptation and the handling becomes simple too.

PREFERRED EMBODIMENT OF THE INVENTION

Figure 1:
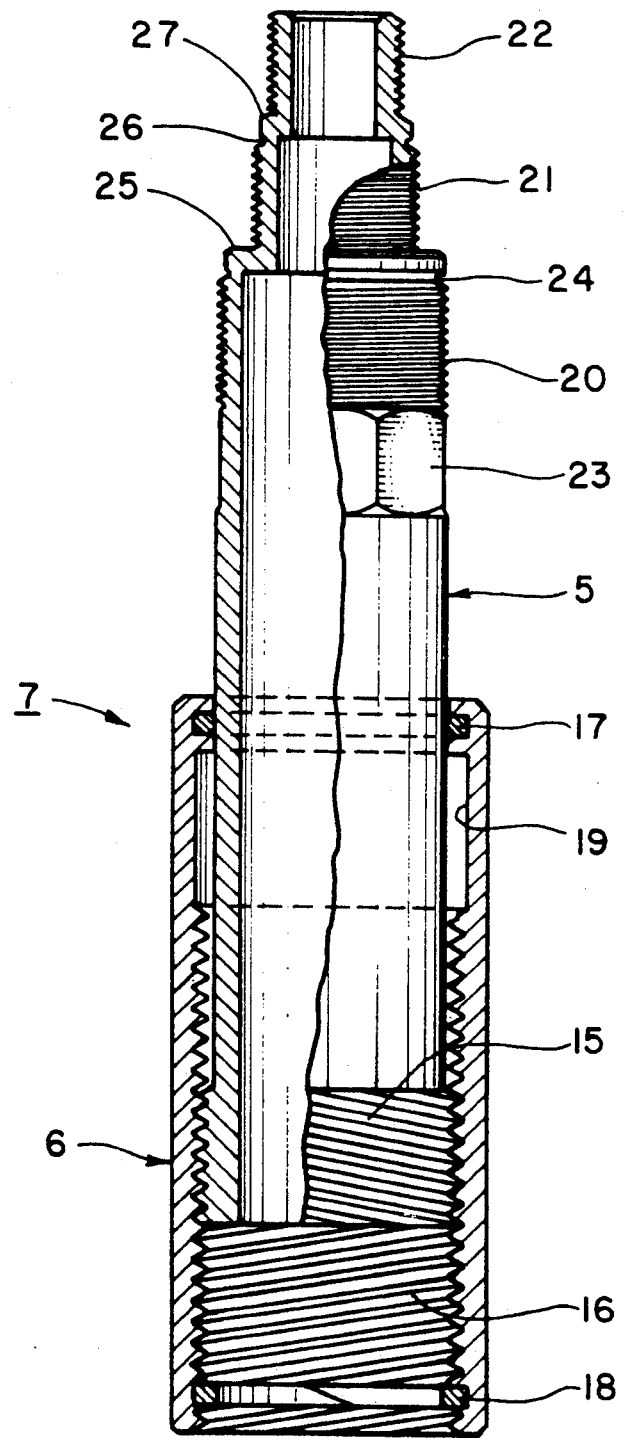
FIG. 1 is a partially cutaway elevation of a joint of this invention.
Figure 2:
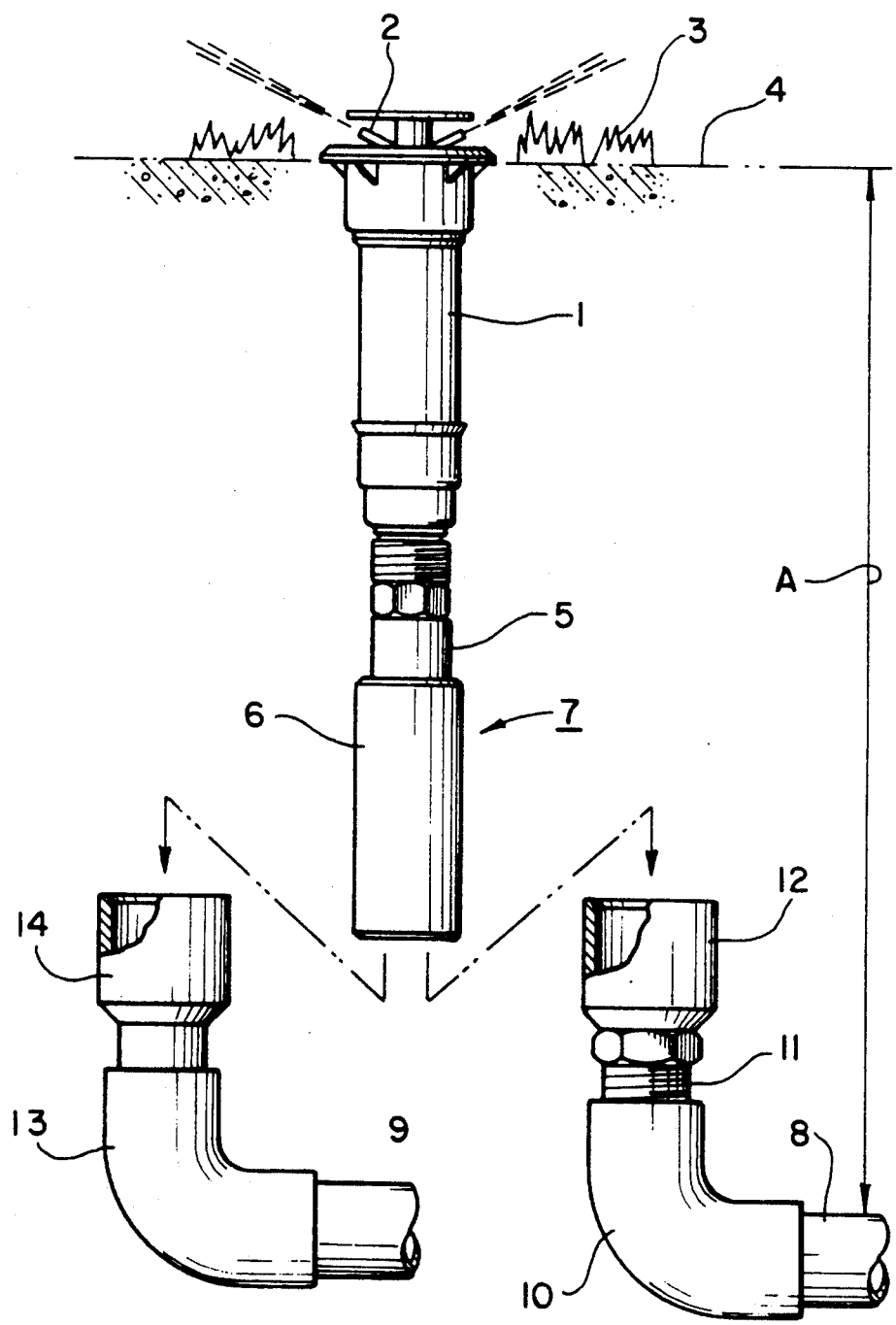
FIG. 2 is an illustration showing that a sprinkler is connected to an underground water pipe by way of the joint.

This invention will be described in detail with reference to the attached drawing. As shown in FIGS. 1 and 2, a sprinkler 1 is put in the ground in the vertical position in order that its head may be flush with the ground surface 4 on which man grows the lawn 3. A sprinkling nozzle 2 is put on the head of the sprinkler 1 in such a manner as to freely get in or get out thereof depending on the water pressure.

A joint 7, comprised of double shelled inner and outer pipes 5 and 6, is connected to the sprinkler 1 at the upper end of its inner pipe 5 and connected to a plastic joint 12 or 14 at the lower end of its outer pipe 6. Furthermore, the plastic joint 12 or 14 is connected to an underground water pipe 8 or 9, made of plastic or iron, by means of a plastic or iron elbow 10 or 13 put between. Although not shown in FIG. 2, the other end of the underground water pipe 8 or 9 is connected to a water valve from which water is fed to the sprinkler 1 and sprinkled on the surrounding lawn 3 by means of the sprinkling nozzle 2.

Figure 3:
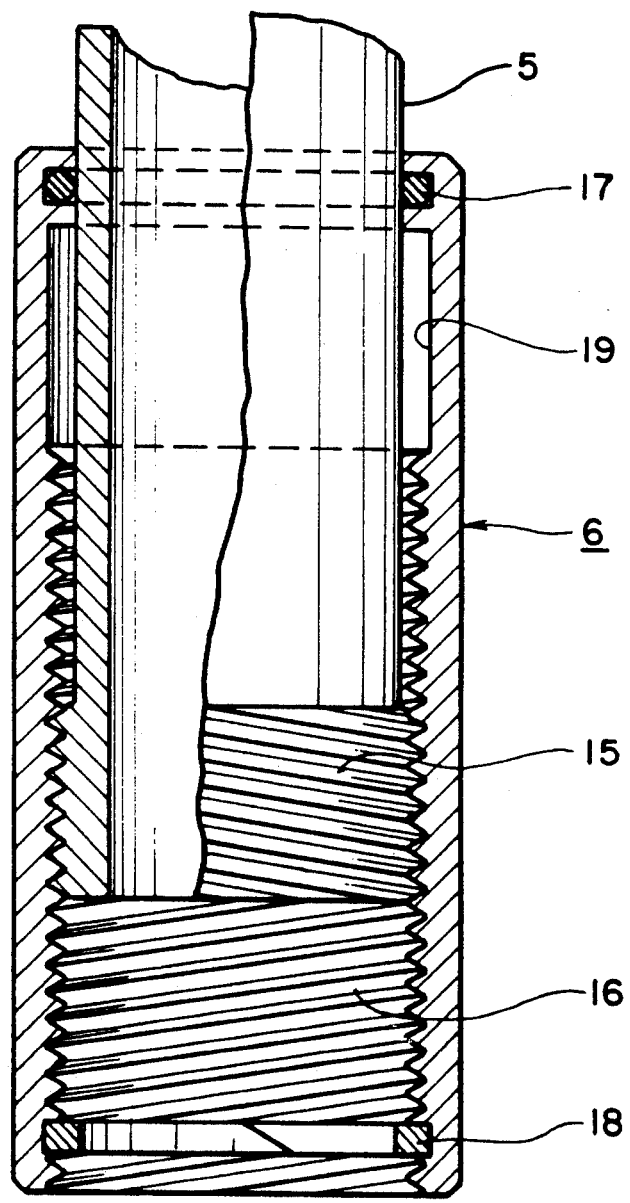
FIGS. 3 and 4 are a partially cutaway and enlarged view of the joint shown in FIG. 1.

As shown in FIG. 3, six start left-hand male thread 15 is formed on the outside of the inner pipe 5 at the lower end thereof and six start left-hand female thread 16 is formed on the inside of the outer pipe 6 at the middle portion or the lower end thereof in order that the male thread 15 of the inner pipe 5 and the female thread 16 of the outer pipe 6 may engage with each other, whereby the joint 7 can be lengthened or shortened in its axial longitudinal direction.

An O-ring is provided to on the inside of the outer pipe 6 at its upper end in order to make there water tight. An annular groove is provided to on the lower end of the female thread 16 of the outer pipe 6 and a stopper ring 18 is put in the annular groove in order that the inner pipe 5 may not get out of the outer pipe 6.

A non-threaded portion 19 is provided to on the inside of the outer pipe 6 between the 0-ring and the upper end of the female thread 16. Also, the major diameter of the male thread 15 of the inner pipe 5 and the inside diameter of the non-threaded portion 19 of the outer pipe 6 are made approximately the same and the span of the non-threaded portion is made a little greater than or equal to the span of the male thread 15 of the inner pipe 5, whereby the inner pipe 5 and the outer pipe 6 can freely rotate when the joint 7 is lengthened up to its maximum length and the male thread 15 becomes disengaged from the female thread 16.

The construction of the joint 7 is such that when the lawn 3 grows taller than the sprinkling nozzle 2 and disturbs watering as rich soil is placed on the ground, the sprinkler 1 and the inner pipe 5 are turned together clockwise in order that the sprinkling nozzle 2 is raised by an appropriate height A above the underground water pipe 8 or 9 in order that the sprinkling water may not be interrupted by the lawn, after soil surrounding the sprinkler 1 is removed.

Figure 4:
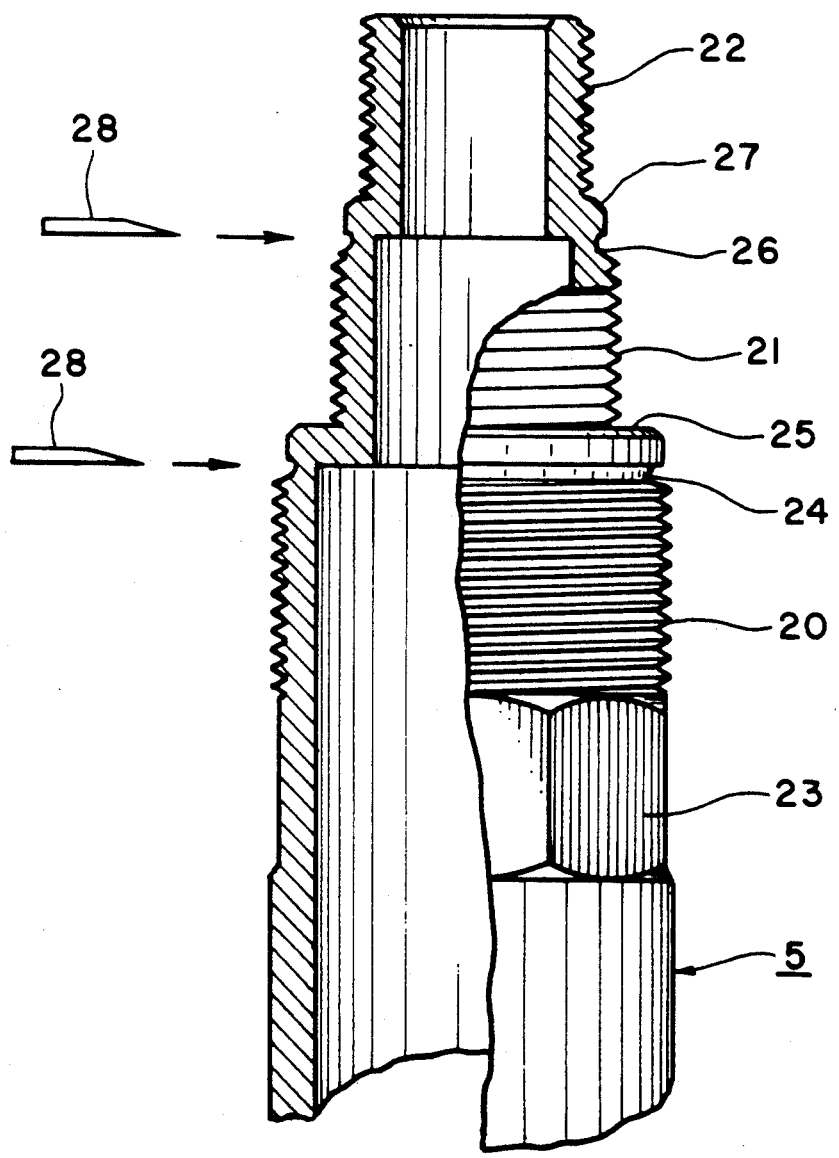

In the meantime, according to the invention, a plurality of stepped right-hand male threads 20, 21 and 22, of which the outer diameter is standardized to, for example, 1.5 inch, 1.25 inch and 1 inch respectively, can also be provided to on the outside of the upper end of the inner pipe 5, as shown in FIG. 4. A polygonal portion 23 for open-end wrenches is formed between the first thread 20, greatest of the three in diameter, and the non-threaded portion of the inner pipe 5 and an annular groove 24 is provided to on the upper end of the first thread 20. Likewise, an annular groove 26 is provided to on the upper end of the thread 21, of which the lower end is connected to the first thread 20 with a joint portion 25 put between. The third thread 22, smallest of the three in diameter, is thus formed on the annular groove 26 with a joint portion 27 put between.

The annular grooves 24 and 26 are a marking for cutting away one or two steps of thread from the inner pipe 5 by using a cutting means 28, such as saws and the like, when they are found to be too small to fit with the female thread at the lower end of the sprinkler 1. At the time of cutting stepped thread from the inner pipe, the joint portions 25 or 27 is cut away together with the thread. Thus, when the diameter on the bottom of the annular groove 24 (or 26) is made a little smaller than the minor diameter of the male thread 20 (or 21), there clearly appears the end of the male thread 20 (or 21) on the section 24 (or 26).

EFFECT OF THE INVENTION

As clearly seen from the above, according to the invention, a conventional joint for sprinklers can be improved by providing a non-threaded portion to the end of female thread on the inside of an outer pipe so that male thread on the outside of an inner pipe can disengage from the female thread when the joint is lengthened up to its maximum length. With this device, those who deal with the sprinkler are able to know its full length and will never damage the threads of the joint.

Also, according to the invention, a conventional joint for sprinklers can be improved by providing a plurality of stepped male threads to the end of the inner pipe with the smallest diametered one at the top and the largest diametered one at the base and providing an annular groove to the foot of each thread. With this device, a sprinkler different in diameter can be connected to any one of the threads of the joint only by cutting off needless thread and thereby the production cost can be reduced and the handling becomes simple.

Although the invention has been described in its preferred form with a certain degree of particularity, it is understood that the present disclosure of the preferred form may be changed in the details of construction and arrangement of parts may be changed or modified to without departing from the spirit and the scope of the invention as hereinafter claimed.

What is claimed is:

1. A joint, for connecting a sprinkler to an underground water pipe, which is used to raise the head of the sprinkler above the lawn, depending upon the rise of the ground surface of the lawn comprising: a double shelled arrangement of an inner piper and an outer pipe, the outer pipe having a female thread on the portion of the inside thereof distal to the sprinkler, the inner pipe having a male thread on the portion of the outside thereof distal to the sprinkler and having a male thread on the portion of the outside thereof proximate to the sprinkler, the inner pipe and the outer pipe being directly engaged with each other by the male threads thereof and the female threads thereof, respectively, except when the joint is lengthened to its maximum length, when the joint is lengthened to its maximum length, the male threads of the portion of the inner pipe distal to the sprinkler and the female threads of the outer pipe are disengaged, and the male thread portion of the inner pipe distal to the sprinkler is rotatable in the portion of the outer pipe proximate to the sprinkler, and a limiting means, which is located on the end of the outer pipe proximate to the sprinkler and which prevents movement of the male threaded portion of the inner pipe beyond the end of the outer pipe proximate to the sprinkler.

2. The joint as claimed in claim 1 wherein a second limiting means is located on the end of the outer pipe distal to the sprinkler and which prevents movement of the male threaded portion of the inner pipe beyond the end of the outer pipe distal to the sprinkler.

3. The joint as claimed in claim 2 wherein said male thread proximate to the sprinkler includes a plurality of adjacent stepped male threaded portions reducing in size toward the end of the inner pipe, with the smallest diametered stepped male threaded portion at the end and an annular groove is provided between each of said adjacent stepped male threaded portions.

4. The joint as claimed in claim 1 wherein said male thread proximate to the sprinkler includes a plurality of adjacent stepped male threaded portions reducing in size toward the end of the inner pipe, with the smallest diametered stepped male threaded portion at the end and an annular groove is provided between each of said adjacent stepped male threaded portions.

5. The joint as claimed in claim 1 for connecting a sprinkler to an underground water pipe.

* * * * *